United States Patent
Noguchi et al.

(10) Patent No.: US 9,798,702 B2
(45) Date of Patent: Oct. 24, 2017

(54) DISPLAY CONTROL APPARATUS AND RECORDING MEDIUM

(71) Applicant: FUJI XEROX CO., LTD, Minato-ku, Tokyo (JP)

(72) Inventors: Hiroki Noguchi, Kanagawa (JP); Kiyoshi Takahashi, Kanagawa (JP); Kazuya Iimura, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 133 days.

(21) Appl. No.: 14/201,124

(22) Filed: Mar. 7, 2014

(65) Prior Publication Data

US 2014/0380152 A1   Dec. 25, 2014

(30) Foreign Application Priority Data

Jun. 19, 2013   (JP) .................. 2013-128627

(51) Int. Cl.
  *G06F 17/00*   (2006.01)
  *G06F 17/21*   (2006.01)
  (Continued)

(52) U.S. Cl.
  CPC .......... *G06F 17/212* (2013.01); *G06F 17/211* (2013.01); *G06F 3/0483* (2013.01); *G06F 3/04883* (2013.01); *G06F 3/1204* (2013.01); *G06F 3/1208* (2013.01); *G06F 3/1285* (2013.01); *G06F 17/217* (2013.01); *G06F 17/218* (2013.01); *G06F 17/2247* (2013.01);
  (Continued)

(58) Field of Classification Search
  CPC ...... G06F 17/212; G06F 17/218; G06F 17/25; G06F 17/211; G06F 17/30905; G06F 17/243; G06F 17/2294; G06F 17/24; G06F 17/2247; G06F 17/217; G06F 3/0483; G06F 3/04883; G06F 3/1204; G06F 3/1244; G06F 3/1208; G06F 3/1285; G06F 3/1205
  USPC .................. 715/243–247, 755, 790
  See application file for complete search history.

(56) References Cited

U.S. PATENT DOCUMENTS

| | | | |
|---|---|---|---|
| 6,037,941 A * | 3/2000 | Goto .................. | G06F 3/0483 707/E17.008 |
| 2002/0041717 A1* | 4/2002 | Murata ................ | G06T 5/006 382/275 |

(Continued)

FOREIGN PATENT DOCUMENTS

| | | |
|---|---|---|
| JP | 8-292861 A | 11/1996 |
| JP | 2000-339327 A | 12/2000 |

(Continued)

OTHER PUBLICATIONS

Communication dated Oct. 21, 2014, issued by the Japanese Patent Office in counterpart Japanese application No. 2013-128627.

*Primary Examiner* — Quoc A Tran
(74) *Attorney, Agent, or Firm* — Sughrue Mion, PLLC

(57) ABSTRACT

A display control apparatus includes: a display control unit that displays a first page to which an object is affixed at a designated position and a second page as arranged side by side on a display; a detecting unit that detects overlap between the object and the second page when the first page and the second page are arranged side by side; and a processing unit that performs a process for preventing a reduction in visual recognizability of the second page displayed on the display due to the overlap in the case where the overlap is detected by the detecting unit.

8 Claims, 6 Drawing Sheets

(51) Int. Cl.
  *G06F 3/12*        (2006.01)
  *G06F 3/0483*      (2013.01)
  *G06F 17/24*       (2006.01)
  *G06F 17/25*       (2006.01)
  *G06F 17/22*       (2006.01)
  *G06F 3/0488*      (2013.01)
  *G06F 17/30*       (2006.01)

(52) U.S. Cl.
  CPC .......... *G06F 17/2294* (2013.01); *G06F 17/24* (2013.01); *G06F 17/243* (2013.01); *G06F 17/25* (2013.01); *G06F 17/30905* (2013.01)

(56) References Cited

U.S. PATENT DOCUMENTS

2006/0190811 A1* 8/2006 Ohno .................... G06F 17/212
                                                715/255
2010/0058161 A1* 3/2010 Coldicott ............. G06T 11/206
                                                715/211

FOREIGN PATENT DOCUMENTS

| JP | 2005-202596 A | 7/2005 |
| JP | 2006-243935 A | 9/2006 |
| JP | 2007-317212 A | 12/2007 |
| JP | 2011-43895 A | 3/2011 |
| JP | 2012-203643 A | 10/2012 |

* cited by examiner

FIG. 4

| OBJECT NUMBER | PAGE NUMBER | OBJECT COORDINATE | ... |
|---|---|---|---|
| 1 | 1 | (x11, y11), (x12, y12), (x13, y13), (x14, y14) | ... |
| 2 | 2 | (x21, y21), (x22, y22), (x23, y23), (x24, y24) | ... |
| 3 | 4 | (x31, y31), (x32, y32), (x33, y33), (x34, y34) | ... |
| ... | ... | ... | ... |

DISPLAY CONTROL APPARATUS AND RECORDING MEDIUM

CROSS-REFERENCE TO RELATED APPLICATIONS

This application is based on and claims priority under 35 USC 119 from Japanese Patent Application No. 2013-128627 filed Jun. 19, 2013.

BACKGROUND (i) Technical Field

The present invention relates to a display control apparatus and a recording medium.

(ii) Related Art

Technologies for affixing a tag object to an electronic document are known in the art.

SUMMARY

According to an aspect of the present invention, there is provided a display control apparatus including: a display control unit that displays a first page to which an object is affixed at a designated position and a second page as arranged side by side on a display; a detecting unit that detects overlap between the object and the second page when the first page and the second page are arranged side by side; and a processing unit that performs a process for preventing a reduction in visual recognizability of the second page displayed on the display due to the overlap in the case where the overlap is detected by the detecting unit.

BRIEF DESCRIPTION OF THE DRAWINGS

An exemplary embodiment of the present invention will be described in detail based on the following figures, wherein:

FIG. 4 illustrates an example of object data;

DETAILED DESCRIPTION

Figure 1:
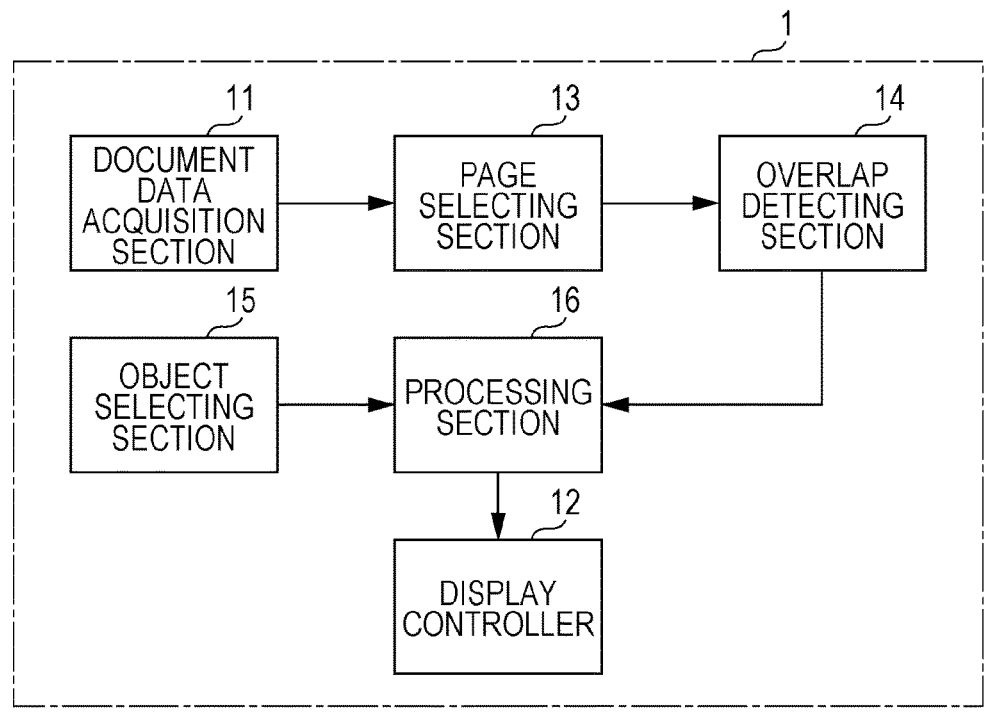
FIG. 1 is a block diagram illustrating the functional configuration of a display control apparatus.

FIG. 1 is a block diagram illustrating the functional configuration of a display control apparatus 1 according to an exemplary embodiment of the present invention. The display control apparatus 1 is an apparatus that displays pages of an electronic document side by side on a display to allow a user to view or edit the electronic document. The display control apparatus 1 includes a document data acquisition section 11, a display controller 12, a page selecting section 13, an overlap detecting section 14, an object selecting section 15, and a processing section 16. The document data acquisition section 11 acquires document data indicating the electronic document. The electronic document includes a tag object affixed at a position designated by the user on a page designated by the user. The tag object is an object affixed at the designated position on the designated page in the electronic document. The tag object is displayed as an image that looks like a tag. The tag object may be displayed with a part of the tag object lying off the page to which the tag object is affixed. The display controller 12 (an example of the display control unit) displays pages of the electronic document indicated by the document data acquired by the document data acquisition section 11 side by side on the display. The page selecting section 13 (an example of the page selecting unit) selects one of a page to which a tag object is affixed at a designated position (hereinafter referred to as a "first page") and a page that is different from the first page (hereinafter referred to as a "second page"). The overlap detecting section 14 (an example of the detecting unit) detects overlap between the object affixed to the first page and the second page when the first page and the second page are arranged side by side. The object selecting section 15 (an example of the object selecting unit) selects the object affixed to the first page. In the case where such overlap is detected by the overlap detecting section 14, the processing section 16 (an example of the processing unit) performs a process for preventing a reduction in visual recognizability of the second page displayed on the display due to the overlap (hereinafter referred to as a "preventing process"). The processing section 16 performs the preventing process in the case where the second page is selected by the page selecting section 13. Meanwhile, the processing section 16 does not perform the preventing process in the case where the object affixed to the first page is selected by the object selecting section 15.

Figure 2:
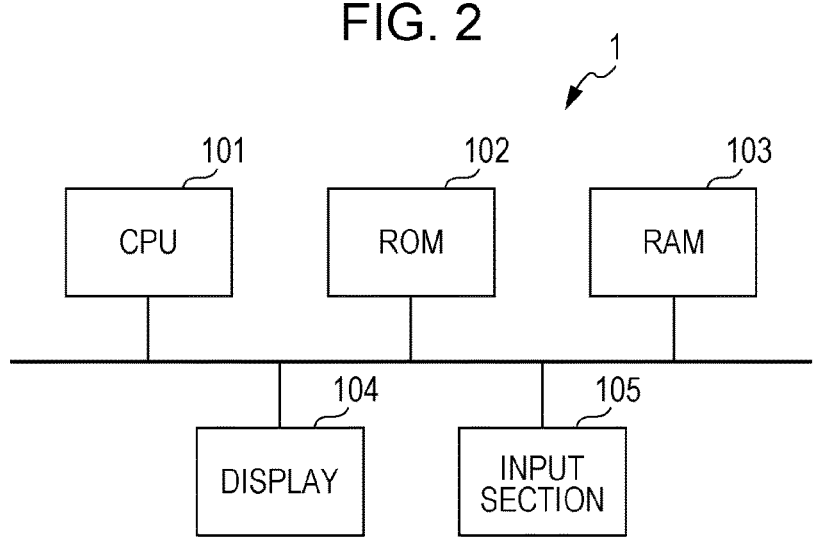
FIG. 2 is a block diagram illustrating the hardware configuration of the display control apparatus.

FIG. 2 is a block diagram illustrating the hardware configuration of the display control apparatus 1. The display control apparatus 1 is a computer that includes a central processing unit (CPU) 101, a read only memory (ROM) 102, a random access memory (RAM) 103, a display 104, and an input section 105. The CPU 101 is a control device that controls various sections of the display control apparatus 1 by executing a display program according to the present invention. The ROM 102 is a non-volatile storage device that stores various programs and data. The RAM 103 is a volatile storage device that stores data. The display 104 includes a display device such as a liquid crystal display or an organic electroluminescence (EL) display. The input section 105 is a device that receives an input by the user, and includes a keyboard, a mouse, various buttons, and so forth. In the display control apparatus 1, the CPU 101 which executes the display program is an example of the document data acquisition section 11, the page selecting section 13, the overlap detecting section 14, and the processing section 16. The CPU 101 which controls the display 104 by executing the display program is an example of the display controller 12. The CPU 101 which controls the input section 105 by executing the display program is an example of the object selecting section 15.

Figure 3:
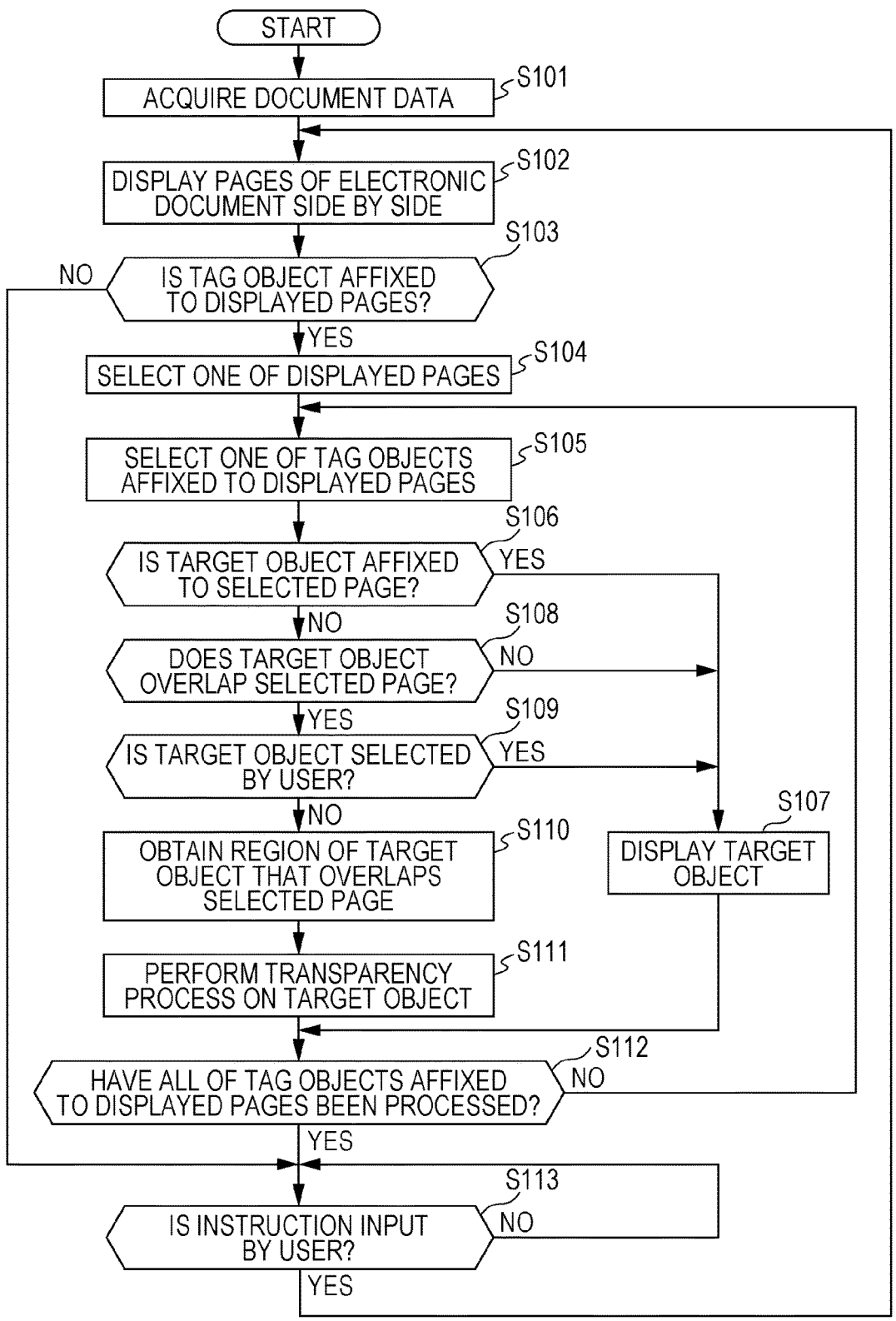
FIG. 3 is a flowchart illustrating a process executed by the display control apparatus.

FIG. 3 is a flowchart illustrating a process executed by the display control apparatus 1. The following process is started when an instruction for executing the display program is input to the display control apparatus 1. The instruction for executing the display program is input by the user by operating the input section 105.

In step S101, the CPU 101 acquires document data. Specifically, the CPU 101 reads document data from a storage device such as a hard disk drive (HDD), and stores the document data in the RAM 103. In step S102, the CPU 101 displays pages of an electronic document indicated by the document data side by side on the display 104. The expression "display side by side" refers to displaying pages so as not to overlap each other. For example, the CPU 101 displays a first page and a second page of the electronic document side by side on the display 104. The pages displayed on the display 104 are hereinafter expressed as "displayed pages". The CPU 101 stores the page numbers of the displayed pages in the RAM 103.

In step S103, the CPU 101 determines whether or not a tag object is affixed to the displayed pages. The document data include object data indicating the affixed tag object. The object data indicate the attribute of the tag object. Examples of the attribute of the tag object include the page in the electronic document to which the tag object is affixed, the position in the page at which the tag object is affixed, the color of the tag object, and the text string written in the tag object. The CPU 101 determines based on the object data and the page numbers of the displayed pages stored in the RAM 103 whether or not a tag object is affixed to the displayed pages. In the case where it is determined that a tag object is affixed to the displayed pages (step S103: YES), the CPU 101 proceeds to step S104. In the case where it is determined that a tag object is not affixed to the displayed pages (step S103: NO), the CPU 101 proceeds to step S113.

FIG. 4 illustrates an example of the object data. The "object number" is a number that identifies a tag object affixed to an electronic document. The "page number" indicates the number of the page to which the tag object is affixed. In the example illustrated in FIG. 4, tag objects with object numbers "1", "2", and "3" are affixed to a first page, a second page, and a fourth page, respectively. The "object coordinate" indicates coordinates on the page at which the tag object is affixed. The "object coordinate" indicates the coordinates of the vertexes of the tag object in a coordinate system based on a predetermined point (for example, the point at the upper left corner of the page) on the page to which the tag object is affixed. In the example illustrated in FIG. 4, the tag objects are rectangular, and four object coordinates are indicated for each tag object. For example, the tag object with an object number of "1" is affixed at a position at which the coordinates of its vertexes are (x11, y11), (x12, y12), (x13, y13), and (x14, y14) in the coordinate system of the first page. The object data are updated when a tag object is moved, a tag object is resized, or a tag object is added or deleted.

FIG. 3 is referenced again. In step S104, the CPU 101 selects one of the displayed pages. One of the displayed pages is selected based on a predefined algorithm. For example, in the case where the user operates the input section 105 to input an instruction for designating one of the displayed pages (hereinafter referred to as a "page designating instruction"), the page designated by the instruction is selected. In the case where no page designating instruction is input, the displayed pages with the largest display area on the display 104 are selected sequentially in the ascending order of the page number. In the following, the selected one of the displayed pages is expressed as a "selected page", and the remaining unselected page is expressed as an "unselected page". The CPU 101 distinguishes the page number of the selected page and the page number of the unselected page for the page numbers of the displayed pages stored in the RAM 103, and stores the page number of the selected page in the RAM 103.

In step S105, the CPU 101 selects one of the tag objects affixed to the displayed pages. Specifically, the CPU 101 specifies tag objects affixed to the displayed pages based on the page numbers of the displayed pages stored in the RAM 103 and the object data, and stores the object numbers of the tag objects in the RAM 103. The CPU 101 selects one of the specified tag objects. For example, the CPU 101 selects the tag objects sequentially in the ascending order of the object number. The CPU 101 distinguishes the object number of the selected one tag object (hereinafter referred to as a "target object") from the object numbers of the other tag objects, and stores the object number of the selected tag object in the RAM 103. For example, in the case where the displayed pages are the first page and the second page, tag objects with object numbers "1" and "2" are specified as the tag objects affixed to the displayed pages from the object data illustrated in FIG. 4. Then, the CPU 101 selects the tag object with an object number of "1", and stores "1" in the RAM 103 as the object number of the target object.

In step S106, the CPU 101 determines whether or not the target object is affixed to the selected page. Specifically, the CPU 101 determines based on the object number of the target object stored in the RAM 103, the page number of the selected page, and the object data whether or not the target object is affixed to the selected page. For example, in the case where the page number of the selected page is "1" and the object number of the target object is "1", it is determined that the target object is affixed to the selected page. In another example, in the case where the page number of the selected page is "1" and the object number of the target object is "2", it is determined that the target object is not affixed to the selected page. In the case where it is determined that the target object is affixed to the selected page (step S106: YES), the CPU 101 proceeds to step S107. In the case where it is determined that the target object is not affixed to the selected page (step S106: NO), the CPU 101 proceeds to step S108.

In step S107, the CPU 101 displays the target object on the display 104. Specifically, the CPU 101 reads an object coordinate from the object data based on the object number of the target object, and displays the target object on the display 104 based on the object coordinate. The CPU 101 displays the target object as overlapped on the displayed pages.

In step S108, the CPU 101 determines whether or not the target object overlaps the selected page. Specifically, the CPU 101 first reads an object coordinate from the object data based on the object number of the target object. Based on the object coordinate, the CPU 101 calculates the coordinates of the vertexes (hereinafter referred to as "vertex coordinates"), on the display 104, of the target object displayed as overlapped on the unselected page. The CPU 101 stores the calculated vertex coordinates in the RAM 103. The CPU 101 determines whether or not any of the vertex coordinates is included in the region in which the selected page is displayed. In the case where it is determined that the target object overlaps the selected page (step S108: YES), the CPU 101 proceeds to step S109. In the case where it is determined that the target object does not overlap the selected page (step S108: NO), the CPU 101 proceeds to step S107.

In step S109, the CPU 101 determines whether or not the target object is selected by the user. The target object is selected by the user by operating the input section 105 to input an instruction for designating the target object displayed on the display 104 (hereinafter referred to as an "object designating instruction"). The CPU 101 determines that the target object is not selected before the target object is displayed on the display 104. In the case where it is determined that the target object is selected (step S109: YES), the CPU 101 proceeds to step S107. In the case where it is determined that the target object is not selected (step S109: NO), the CPU 101 proceeds to step S110.

In step S110, the CPU 101 obtains a region of the target object that overlaps the selected page. Specifically, the CPU 101 reads the vertex coordinates calculated in step S108 from the RAM 103, and obtains a region over which the region surrounded by the vertex coordinates and the region in which the selected page is displayed overlap each other. The CPU 101 stores data indicating the obtained region in the RAM 103. In step S111, the CPU 101 performs a transparency process (an example of the preventing process) on the target object. The term "transparency process" refers to a process in which the transparency of a region of the target object that overlaps the selected page is increased compared to the transparency of a region of the target object that overlaps the unselected page. The CPU 101 reads data indicating a region of the target object that overlaps the selected page from the RAM 103, and increases the transparency of pixels included in the region. The CPU 101 displays the target object which has been subjected to the transparency process on the display 104.

In step S112, the CPU 101 determines whether or not all of the tag objects affixed to the displayed pages have been processed as the target object. In the case where it is determined that all of the tag objects affixed to the displayed pages have been processed (step S112: YES), the CPU 101 proceeds to step S113. In the case where it is determined that all of the tag objects affixed to the displayed pages have not been processed (step S112: NO), the CPU 101 proceeds to step S105, and selects the next target object from the tag objects affixed to the displayed pages.

In step S113, the CPU 101 determines whether or not an instruction related to an operation of the displayed pages, or an instruction related to an operation of the tag objects, is input by the user. Examples of the instruction related to an operation of the displayed pages include an instruction for scrolling the displayed pages, an instruction for switching the displayed pages, and the page designating instruction discussed above. Examples of the instruction related to an operation of the tag objects include an instruction for moving a tag object, an instruction for resizing a tag object, an instruction for adding or deleting a tag object, and the object designating instruction discussed above. In the case where it is determined that such an instruction is input (step S113: YES), the CPU 101 proceeds to step S102. In the case where it is determined that such an instruction is not input (step S113: NO), the CPU 101 stands by until such an instruction is input.

Figure 5A:
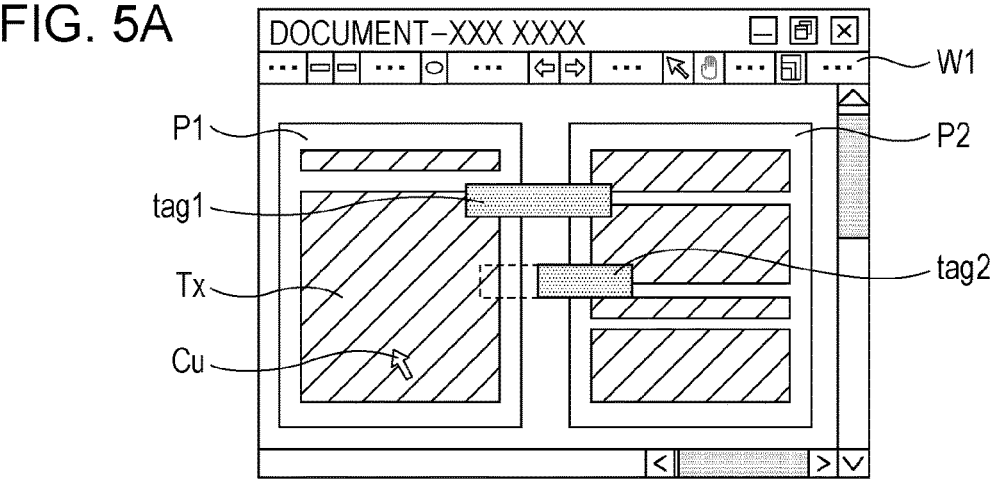
FIGS. 5A to 5C each illustrate a screen displayed by the display control apparatus.
Figure 5B:
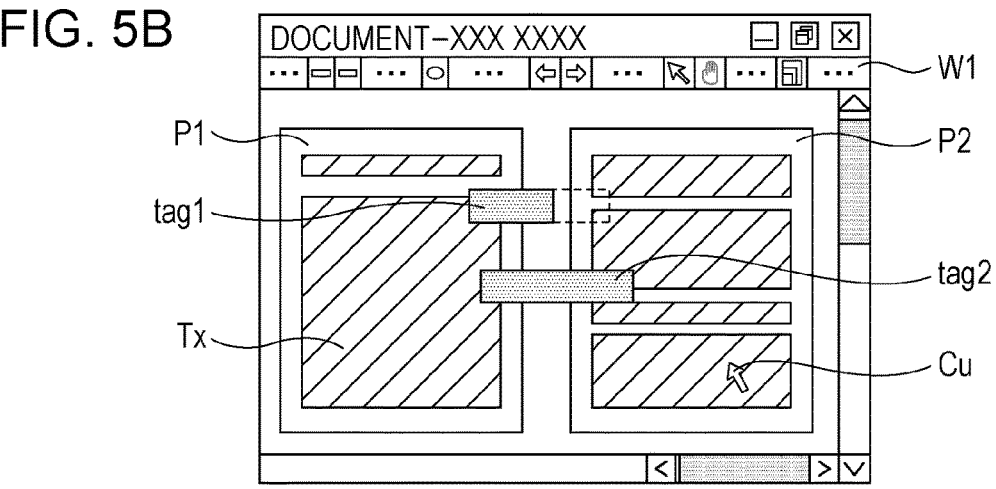
Figure 5C:
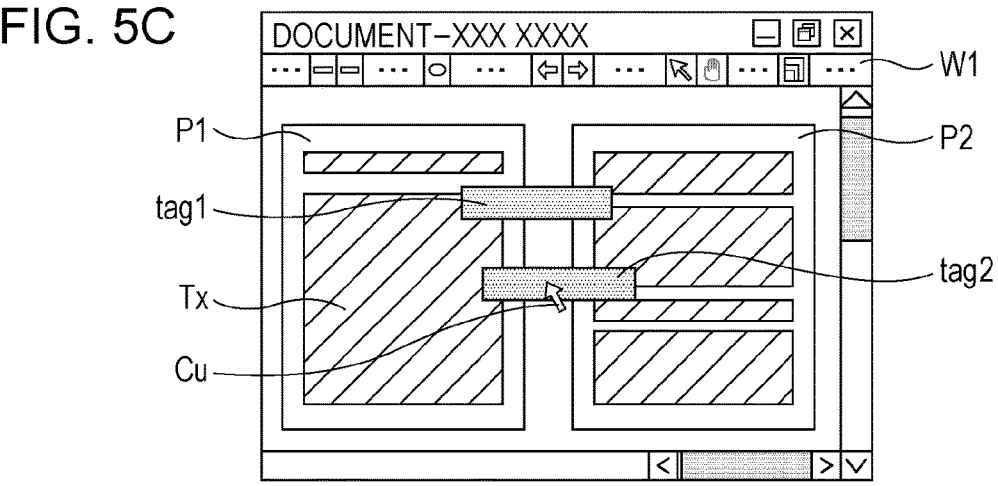

FIGS. 5A to 5C each illustrate a screen displayed by the display control apparatus 1. FIGS. 5A to 5C each illustrate an example in which the display control apparatus 1 displays pages P (P1 and P2) as arranged side by side horizontally in a display region (window W1) on the display 104. In the example of FIGS. 5A to 5C, the page P1 and the page P2 are the displayed pages. The pages P include a text region Tx. The text region Tx is a region in which the content of the electronic document such as text strings and figures is displayed. Tag objects tag (tag1 and tag2) are affixed to the pages P. The tag objects tag are displayed as overlapped on the pages P. The tag object tag1 is a tag object affixed to the page P1. A part of the tag object tag1 that lies off the page P1 overlaps the text region Tx of the page P2. The tag object tag2 is a tag object affixed to the page P2. A part of the tag object tag2 that lies off the page P2 overlaps the text region Tx of the page P1. A cursor Cu is an indicator displayed for the user to designate the target of an instruction or an operation. The page designating instruction and the object designating instruction discussed above are provided by the user by operating a mouse to move the cursor Cu onto the page P or the tag object tag and clicking on the mouse, for example.

FIG. 5A illustrates an example of display of tag objects in which the page P1 is the selected page (the page P2 is the unselected page). In the case where the page P1 is the selected page, the tag object tag1 is affixed to the selected page (step S106: YES), and displayed as overlapped on the page P1 and the page P2 (step S107) without being subjected to the transparency process. On the other hand, the tag object tag2 is not affixed to the selected page (step S106: NO), and is overlapped on the selected page (step S108: YES). In the example of FIG. 5A, in addition, the tag object tag2 is not clicked, and an object designating instruction for the tag object tag2 is not input (step S109: NO). Thus, the transparency process is performed on the tag object tag2 (step S111). FIGS. 5A to 5C illustrate an example of the transparency process in which regions of the tag objects tag that overlap the selected page are not displayed (the transparency of pixels in regions of the tag objects tag that overlap the selected page is maximized). Regions indicated by the broken lines represent regions that have been subjected to the transparency process. The broken lines are provided to indicate the regions that have been subjected to the transparency process for convenience, and are not displayed in the actual window W1. In the example of FIGS. 5A to 5C, a part of a region of the tag object tag subjected to the transparency process (in FIG. 5A, the tag object tag2) that is adjacent to its region that overlaps the selected page (in FIG. 5A, the page P1) and that does not overlap the pages P (the page P1 and the page P2) has also been subjected to the transparency process.

FIG. 5B illustrates an example of display of tag objects in which the page P2 is the selected page (the page P1 is the unselected page). In the case where the page P2 is the selected page, the tag object tag2 is affixed to the selected page (step S106: YES), and displayed as overlapped on the page P1 and the page P2 (step S107) without being subjected to the transparency process. On the other hand, the tag object tag1 is not affixed to the selected page (step S106: NO), and is overlapped on the selected page (step S108: YES). In the example of FIG. 5B, in addition, the tag object tag1 is not clicked, and an object designating instruction for the tag object tag1 is not input (step S109: NO). Thus, the transparency process is performed on the tag object tag1 (step S111). As illustrated in FIGS. 5A and 5B, in the case where a tag object affixed to the unselected page overlaps the selected page, the transparency process is performed on the tag object when the display control apparatus 1 executes the process.

FIG. 5C illustrates an example of display of a tag object affixed to the unselected page for a case where the tag object is selected. FIG. 5C illustrates an example in which an object designating instruction for the tag object tag2 affixed to the unselected page (not affixed to the selected page) is input in the example illustrated in FIG. 5A. When the tag object tag2 is clicked to select the tag object tag2 (step S109: YES), the tag object tag2 is displayed as overlapped on the page P1 and the page P2 (step S107) without being subjected to the transparency process.

The present invention is not limited to the exemplary embodiment described above, and various modifications may be made. Some modifications will be described below. The modifications described below may be used in combination of two or more.

(1) First Modification

The content of the transparency process is not limited to the example described in relation to the exemplary embodiment. For example, a region of the target object that overlaps the selected page may be subjected to the transparency process to a degree visually recognizable by the user.

Figure 6:
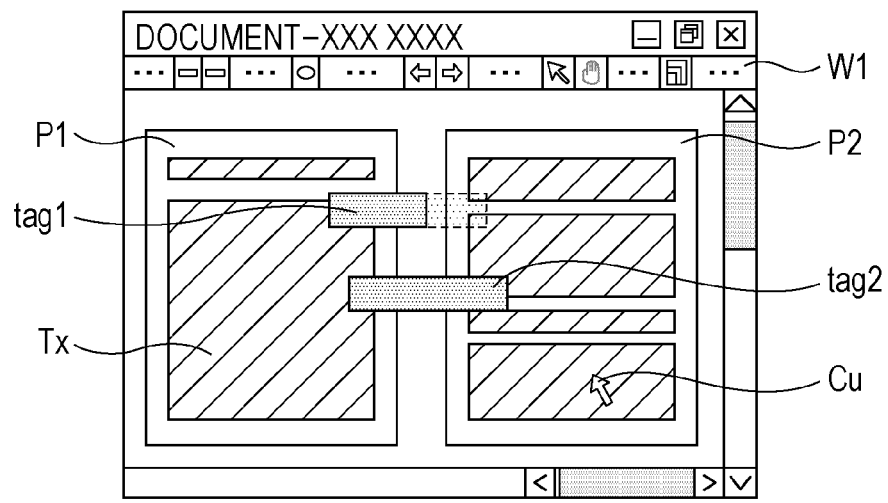
FIG. 6 illustrates a transparency process according to a first modification.

FIG. 6 illustrates a transparency process according to a first modification. FIG. 6 illustrates a transparency process for a case where the page P2 is the selected page. In the transparency process illustrated in FIG. 6, a region of a tag object (in the example, the tag object tag1) that overlaps the selected page (in the example, the page P2) is displayed with a transparency that is higher than that of a region of the tag object that overlaps the unselected page (in the example, the page P1). In the case where such display is made, a region of the selected page that overlaps a tag object affixed to the unselected page is visually recognized through the tag object. In FIG. 6, as in FIGS. 5A to 5C, a part of a region of the tag object tag subjected to the transparency process that does not overlap the pages P has also been subjected to the transparency process.

(2) Second Modification

The tag object to be subjected to the transparency process is not limited to the tag object described in relation to the exemplary embodiment. For example, the transparency process may be performed on a tag object that is affixed to a first page (a certain page) and that overlaps a second page (a page that is different from the certain page). In this case, the processes in step S104 and step S106 are omitted in the process illustrated in FIG. 3. In step S108, in addition, the CPU 101 determines whether or not a tag object affixed to a certain displayed page overlaps other displayed pages. In the case where it is determined that a tag object affixed to a certain displayed page overlaps other displayed pages (step S108: YES), the CPU 101 proceeds to step S109. In the case where it is determined that a tag object affixed to a certain displayed page does not overlap other displayed pages (step S108: NO), the CPU 101 proceeds to step S107. In step S110, in addition, the CPU 101 obtains a region of the tag object affixed to the certain displayed page that overlaps other displayed pages.

Figure 7:
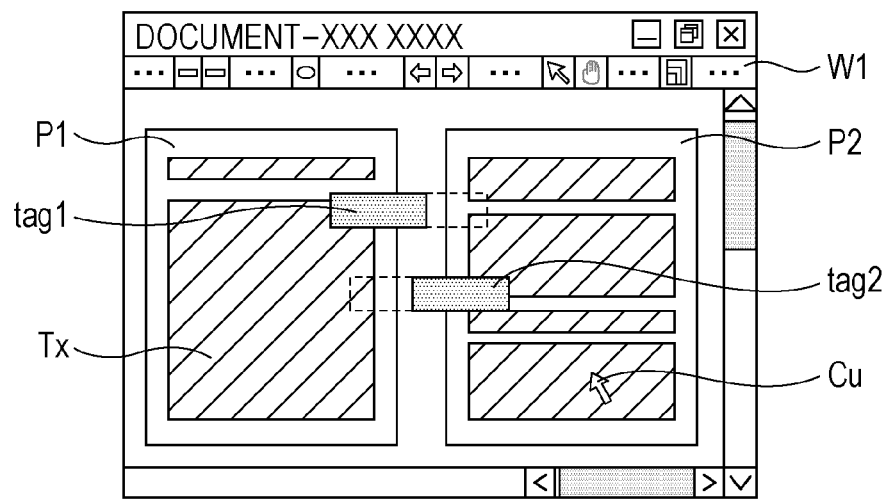
FIG. 7 illustrates a transparency process according to a second modification.

FIG. 7 illustrates a transparency process according to a second modification. In FIG. 7, the tag object tag1 affixed to the page P1 overlaps the page P2, and the tag object tag2 affixed to the page P2 overlaps the page P1 (step S108: YES). Thus, in the example, a transparency process is performed on both the tag object tag1 and the tag object tag2.

(3) Third Modification

The preventing process is not limited to the transparency process. For example, the preventing process may be a process in which at least one of the first page and the second page is moved to a position at which the tag object affixed to the first page and the second page do not overlap each other. In a specific example, the preventing process may be a process in which the gap between the first page and the second page is widened. In this case, the CPU 101 obtains a region over which the tag object affixed to the certain displayed page overlaps other displayed pages. Then, the CPU 101 performs a process in which the gap between the first page and the second page is widened in accordance with the size of the obtained region. For example, the CPU 101 obtains for all the tag objects affixed to the displayed pages a region over which the tag object overlaps another displayed page, and performs a process in which the gap between the pages is widened in accordance with the largest one of the respective sizes of the obtained regions. In another specific example, the preventing process may be a process in which the first page and the second page are displayed as displaced vertically in the case where the first page and the second page are displayed as arranged side by side horizontally.

Figure 8:
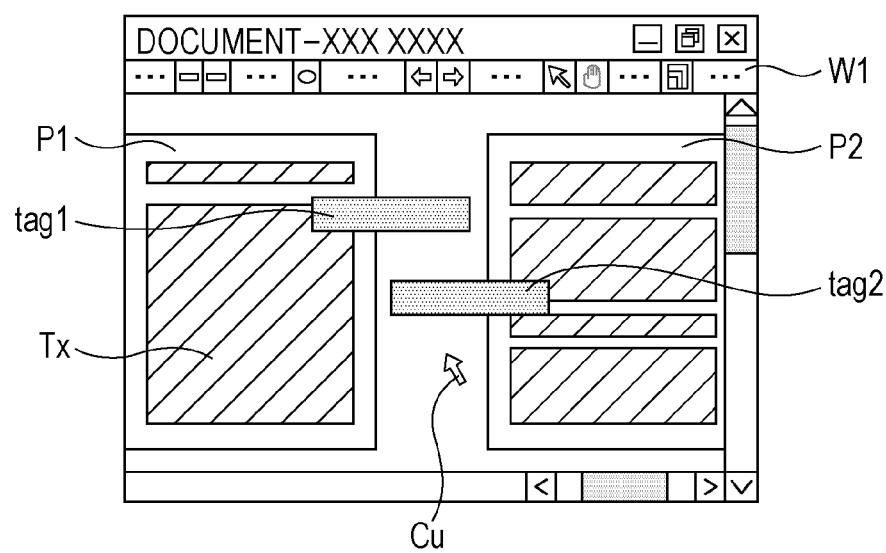
FIG. 8 illustrates a process according to a third modification.

FIG. 8 illustrates a process according to the third modification. In FIG. 8, the process in which the gap between the page P1 and the page P2 is widened is performed so that the tag object tag1 is displayed so as not to overlap the page P2 and the tag object tag2 is displayed so as not to overlap the page P1.

(4) Fourth Modification

The direction (positional relationship) in which pages are arranged is not limited to the example described in relation to the exemplary embodiment. Pages of the electronic document may be displayed side by side vertically.

Figure 9:
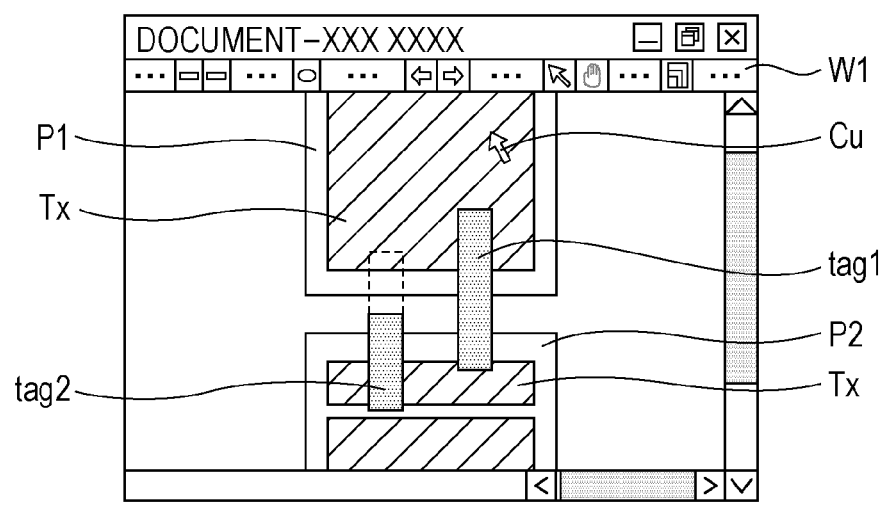
FIG. 9 illustrates a screen displayed in accordance with a fourth modification.

FIG. 9 illustrates a screen displayed in a fourth modification. FIG. 9 illustrates an example in which the display control apparatus 1 displays pages P (P1 and P2) as arranged side by side vertically in a display region (window W1) on the display 104. FIG. 9 illustrates a transparency process for a case where the page P1 is the selected page. In the transparency process illustrated in FIG. 9, a region of a tag object (in the example, the tag object tag2) that overlaps the selected page (in the example, the page P1) is not displayed.

(5) Fifth Modification

The number of tag objects affixed to a certain page is not limited to one. Plural tag objects may be affixed to a certain page. In this case, the processes in step S105 to step S112 are performed for each of the plural tag objects affixed to the certain page.

(6) Sixth Modification

A program executed by the display control apparatus 1 in the exemplary embodiment may be provided as stored in a computer readable recording medium such as a magnetic recording medium (such as a magnetic tape and a magnetic disk (such as an HDD and a flexible disk (FD))), an optical recording medium (such as an optical disk (such as a compact disk (CD) and a digital versatile disk (DVD))), a magneto-optical recording medium, and a semiconductor memory (such as a flash ROM). Alternatively, the program may be downloaded by way of a network such as the Internet.

(7) Other Modifications

In FIG. 5, the broken lines may be displayed in the window W1. In addition, the transparency process may not be performed on a region of the tag object tag subjected to the transparency process that does not overlap the pages P (the page P1 and the page P2).

The hardware configuration of the display control apparatus 1 is not limited to the configuration illustrated in FIG. 2. The display control apparatus 1 may have any hardware configuration as long as the processes in the steps illustrated in FIG. 3 may be executed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
    a display controller configured to cause a display to display a first page and a second page arranged side-by-side, the first page having a tag object affixed at a designated positon;
    a processor configured to detect overlap between the tag object and the second page, in response to the first page and the second page being arranged side-by-side, and to perform, in response to the overlap being detected, a process for preventing a reduction in visual recognizability of the second page displayed on the display due to the overlap; and
    a page selecting unit configured to select the first page or the second page,
    wherein the process includes increasing a first transparency of a region of the tag object that overlaps the second page relative to a second transparency of a region of the tag object that overlaps the first page,
    wherein the tag object is displayed as an image that looks like a tag, and
    wherein the processor is configured to perform the process in response to the second page being selected by the page selecting unit.

2. The display control apparatus according to claim 1, wherein the process includes not displaying the region of the tag object that overlaps the second page.

3. The display control apparatus according to claim 1, further comprising:
    an object selecting unit configured to select the tag object,
    wherein, in response to the tag object being selected by the object selecting unit, the processing unit does not perform the process on the tag object.

4. The display control apparatus according to claim 1, wherein
    the second page has a second tag object affixed at a second designated position,
    the processor is further configured to, in response to detecting a second overlap between the second tag object and the first page, perform a second process for preventing a reduction in visual recognizability of the first page displayed on the display due to the second overlap,
    wherein the second process includes increasing a third transparency of an overlapping region of the second tag object that overlaps the first page relative to a fourth transparency of a non-overlapping region of the second tag object that does not overlap the first page.

5. The display control apparatus according to claim 1, wherein the process further comprises displaying a broken line around the region of the tag object that overlaps the second page.

6. A display control apparatus comprising:
    a display controller configured to cause a display to display a first page and a second page arranged side-by-side, the first page having a tag object affixed at a designated position;
    a processor configured to detect overlap between the tag object and the second page, in response to the first page and the second page being arranged side-by-side, and to perform, in response to the overlap being detected, a process for preventing a reduction in visual recognizability of the second page displayed on the display due to the overlap; and
    a page selecting unit configured to select the first page or the second page,
    wherein the process includes moving at least one of the first page and the second page to a position at which the tag object and the second page do not overlap each other,
    wherein the tag object is displayed as an image that looklike a tag, and
    wherein the processor is configured to perform the process in response to the second page being selected by the page selecting unit.

7. The display control apparatus according to claim 6, wherein the process includes widening a gap between the first page and the second page.

8. A non-transitory computer readable medium storing a program causing a computer to perform a process comprising: displaying a first page to which an tag object is affixed at a designated position and a second page as arranged side by side on a display; detecting overlap between the tag object and the second page when the first page and the second page are arranged side by side; and preventing a reduction in visual recognizability of the second page displayed on the display due to the overlap in the case where the overlap is detected,
    wherein the process includes increasing, in response to the second page being selected, a first transparency of a region of the tag object that overlaps the second page relative to a second transparency of a region of the tag object that overlaps the first page.

* * * * *